F. A. GESSLER.
MILKING MACHINE.
APPLICATION FILED MAR. 25, 1919.

1,333,972.

Patented Mar. 16, 1920.
3 SHEETS—SHEET 1.

WITNESSES

INVENTOR.
F. A. Gessler
BY
ATTORNEY.

F. A. GESSLER.
MILKING MACHINE.
APPLICATION FILED MAR. 25, 1919.

1,333,972.

Patented Mar. 16, 1920.
3 SHEETS—SHEET 2.

WITNESSES
A. L. Dunlap.
L. B. Wood

INVENTOR.
F. A. Gessler.
BY
A. E. Dunlap
ATTORNEY.

F. A. GESSLER.
MILKING MACHINE.
APPLICATION FILED MAR. 25, 1919.
1,333,972.
Patented Mar. 16, 1920.
3 SHEETS—SHEET 3.
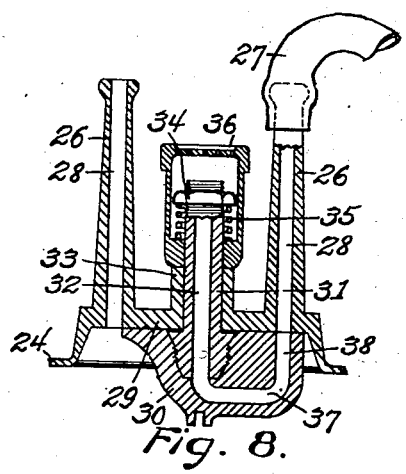
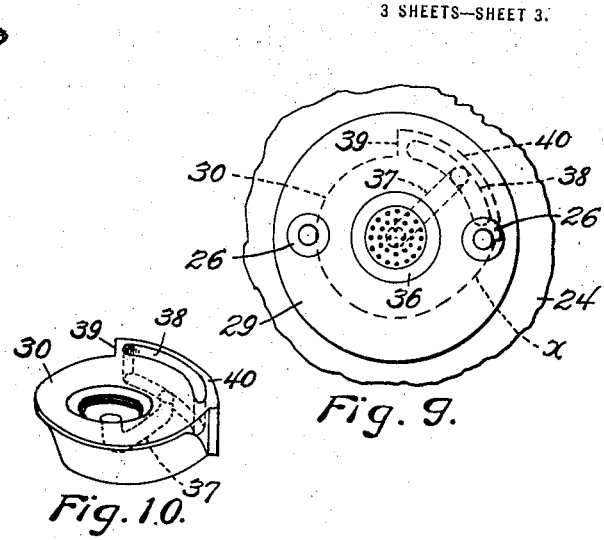
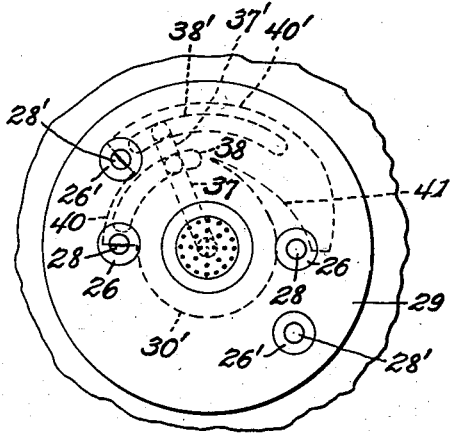
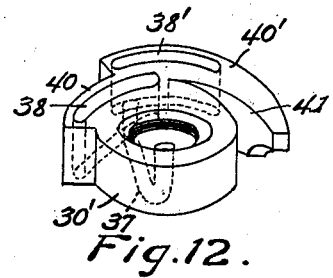
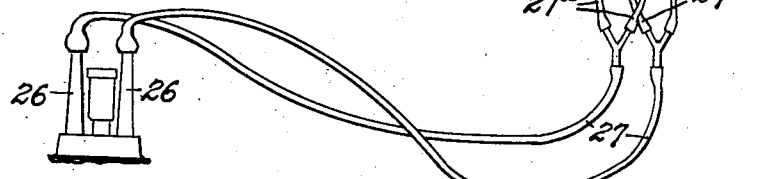
WITNESSES
A. L. Dunlap
L. B. Wood
INVENTOR.
F. A. Gessler.
BY
H. E. Dunlap
ATTORNEY.

UNITED STATES PATENT OFFICE.

FREDERICK A. GESSLER, OF MARTINS FERRY, OHIO.

MILKING-MACHINE.

1,333,972.  Specification of Letters Patent.  Patented Mar. 16, 1920.

Application filed March 25, 1919. Serial No. 285,038.

*To all whom it may concern:*

Be it known that I, FREDERICK A. GESSLER, a citizen of the United States of America, and resident of Martins Ferry, county of Belmont, and State of Ohio, have invented certain new and useful Improvements in Milking-Machines, of which the following is a specification.

This invention relates to milking machines, and more particularly to a self-contained, or unit-type, milking apparatus.

The primary object of the invention is to provide a milking machine or apparatus of self-contained, compact form having a size and weight which render it readily transportable by hand from place to place as convenience or necessity may require.

A further object of the invention is to provide a milking apparatus, embodying a receptacle, or pail, for receiving the milk, which is directly associated with or carries a power-propelled pulsator mechanism whereby variations of pneumatic stress may be produced in a plurality of teat-cups through suitable connections for alternately applying milking pressure to and releasing the teats of a cow received by said cups.

A still further object is to provide an apparatus of the character mentioned, including mechanism for producing sub-atmospheric pressure within the pail, wherein the source of motor energy for propelling the pulsator mechanism and for driving the pressure-reducing mechanism acts from beneath and through the interior of the pail, thus overcoming the necessity for locating parts outside or exterior to the pail.

And a still further object is to provide means whereby parts of the sub-atmospheric pressure producing mechanism carried, respectively, by the pail and by a separable pump-inclosing casing may be readily coupled and uncoupled as occasion requires.

Another object is to provide a power transmission for the pulsator composed of parts located, respectively, within the pail and a separable casing inclosing or carrying the motor, which is automatically coupled and uncoupled by the mere act of seating and unseating said pail with respect to said casing.

With these and other important objects in view, the invention resides in the features of construction, arrangement of parts and combinations of elements which will hereinafter be fully described, reference being had to the accompanying drawings, in which—

Fig. 8 is an enlarged vertical section of the pulsator;

Fig. 9 is a top plan view of the same showing in dotted lines a preferred form of pulsator valve;

Fig. 10 is a perspective view of said valve;

Fig. 11 is a view similar to Fig. 9, showing in dotted lines a modified form of pulsator valve;

Fig. 12 is a perspective view of said modified form of valve; and—

Fig. 13 is a side elevation of the pulsator showing its teat-cup connections.

Referring to said drawings, in which like designating characters distinguish like parts throughout the several views—

Figure 1:
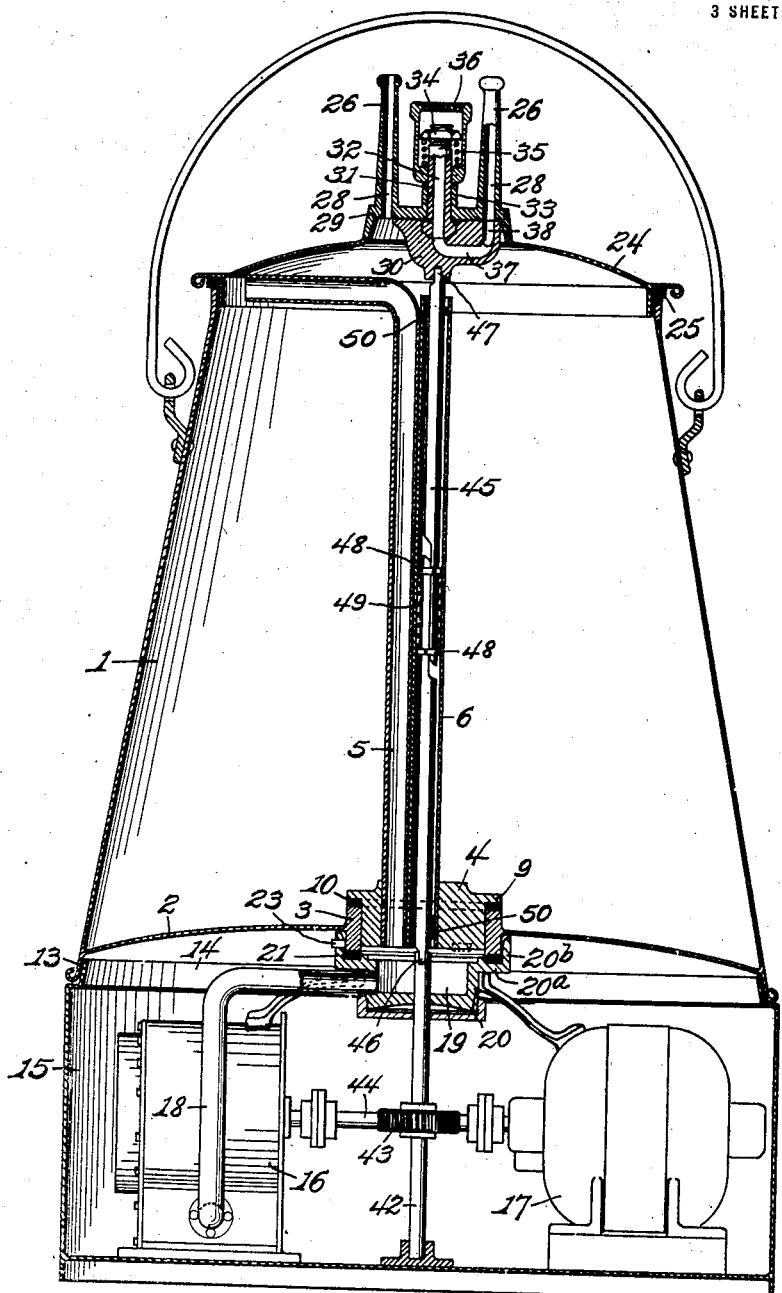
Figure 1 is a vertical section of the invention.
Figure 2:
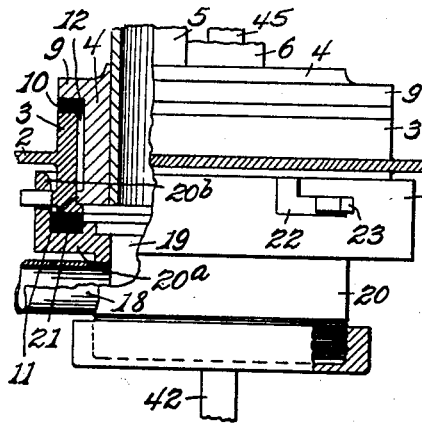
Fig. 2 is an enlarged view, partly in side elevation and partly in vertical section, illustrating the means by which the vacuum-producing and pulsator-driving mechanisms of the detachably connected milk pail and motor-and-pump inclosure are coupled in operative relation.
Figure 3:
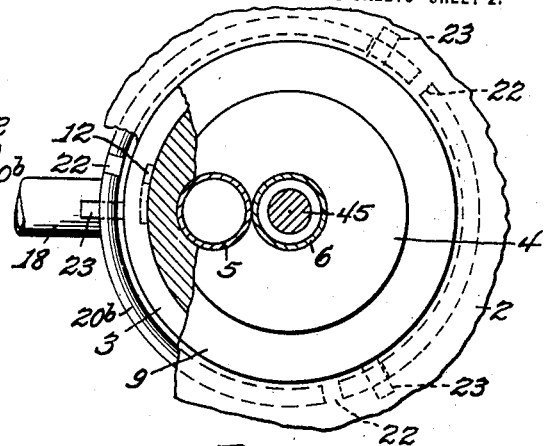
Fig. 3 is a top plan view of the structure shown in Fig. 2.
Figure 4:
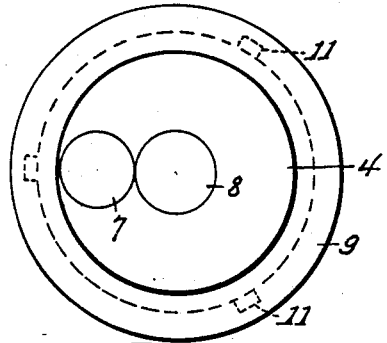
Fig. 4 is a top plan view of the tube-carrying plug.
Figure 5:
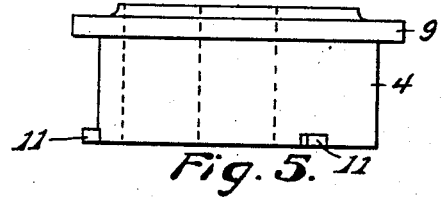
Fig. 5 is a side elevation of the same.
Figure 6:
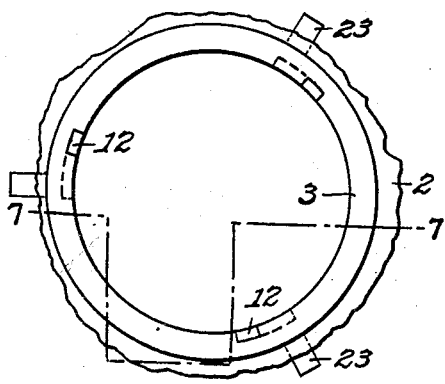
Fig. 6 is a top plan view of the fixed ring carried by the pail bottom.
Figure 7:
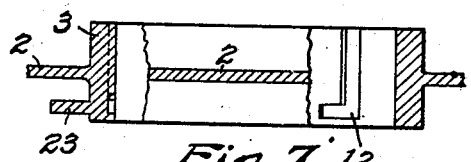
Fig. 7 is a partial vertical section on the line 7—7, Fig. 6.

1 indicates a milk pail which may be of any suitable shape, but which is preferably of the truncated cone shape shown. Said pail has a fixed bottom 2 which has a ring or collar 3 formed integral therewith or fixed thereto at a central point, said collar being disposed in vertical position and being adapted to receive interiorly thereof a neatly-fitting plug 4 which constitutes a mounting for two upright tubes 5 and 6, said tubes having their lower ends respectively fitted in vertical holes 7 and 8 provided therefor in said plug. Said plug has adjacent to its upper end an annular flange 9 which is adapted to seat upon a suitable compressible gasket 10, which rests upon the upper edge of said collar 3. Said plug has provided on its periphery and near its lower end a plurality of spaced radial lugs 11 whereby said plug is detachably interlocked with the collar 3, said lugs being disposed in bayonet grooves 12 provided therefor in the inner periphery of said collar.

The pail 1 has a rim 13 extending downward below the level of its bottom 2 and adapted to seat in close-fitting relation to an inclined annular rim 14 provided upon the upper edge of a casing 15 within which are mounted an air pump 16 and an electric motor 17. Said motor furnishes the power whereby said pump is actuated for producing a partial vacuum within the pail 1 and whereby the movable parts of the apparatus are driven, as will hereinafter be explained.

Leading to the pump 16 is an intake pipe 18 which has communication at its outer end with a chamber 19 formed interiorly of a stationarily supported metal casing 20 which occupies a central position within the upper part of the casing 15. Said casing 20, which is open at its top, is formed with an integral annular horizontal ledge 20$^a$ which, in turn, has a vertically disposed annular flange 20$^b$. Said ledge is designed to have seat thereon with an interposed gasket 21 the lower edge of the collar 3 carried by the pail bottom 2. Spaced bayonet slots 22 provided in the flange 20$^b$ are designed to receive therein outwardly directed spaced lugs 23 carried on the outer periphery of the lower part of the collar 3, whereby said collar is rigidly interlocked with said flange. As is apparent, when the pail is deposited upon the casing 15 with the lugs 23 in registering relation to the vertical arms of the bayonet slots 22, said lugs will move vertically to the lower ends of said arms, whereupon a partial rotation imparted to the pail will carry said lugs into the horizontal arms of said slots, thus interlocking said parts to the extent that the casing 15 containing the motor and air pump may be bodily elevated with the pail when it is desired to transport the same from place to place.

The lower end of the tube 5 hereinbefore referred to opens into the chamber 19, while the upper end thereof is disposed within, and adjacent to the upper edge of, the pail. Obviously, therefore, operation of the pump 16 acts to exhaust air from the pail, producing a partial vacuum which is utilized in a manner to be hereinafter explained.

Removably seated upon the top of the pail is a cover 24, a suitable gasket 25 being preferably employed to insure a tight fit between said pail and said cover. The pail cover carries a plurality of teat-cup connections for communication with the interior of the pail, said connections including nipples 26 adapted to receive thereon the ends of the usual flexible tubes 27 leading to the teat cups, as shown in Fig. 13. Said nipples are formed upon and have the lower ends of the passages 28 thereof opening through a horizontally disposed base member 29 carried by the cover 24, said member having a smooth flat face constituting a seat for the upper face of a rotatable cam-shaped pulsator valve 30 by means of which one or more of the passages or ports 28 are exposed to the sub-atmospheric pressure created within the pail through operation of the pump 16, as aforesaid, while the remaining port or ports 28, previously exposed to said sub-atmospheric pressure, are disposed in positions permitting restoration of atmospheric pressure.

The pulsator valve 30 is eccentrically attached to the lower end of a valve spindle 31 which has an air passage 32 extending therethrough and which is rotatably mounted in an upright sleeve-like bearing 33 carried in a central position by the base member 29. Said spindle preferably has a threaded lower end upon which said valve is detachably mounted, as shown, and it also has its upper end threaded for the reception of a nut 34 by means of which may be adjusted the tension of a spiral spring 35 whereby the valve is held to its seat, said spring being disposed between said adjusting nut and the spindle-embracing base portion of a breather cap 36 which is superposed on the upper end of said bearing 33.

In the preferred form depicted in Figs. 9 and 10, the pulsator valve has a radially extending passage 37 communicating at its inner end with the lower end of the air passage 32 in the spindle and at its opposite end with an elongated port or channel 38 of arcuate form provided in the upper face of said valve adjacent to that portion of the periphery of the latter which is most remote from the spindle 31. In practice, when the valve is rotated, sub-atmospheric pressure provided in the pail through the action of the pump acts through the uncovered port 28 of one of the nipples 26 to collapse the teat cup or cups which are in communication with said port 28 for producing a flow of milk which enters the pail through said port. When the forward end of the channel 38 is carried into register with a previously uncovered port 28, a release of the sub-atmospheric pressure, or a restoration of normal atmospheric pressure, in said port 28 and the teat cup connections is effected through the passages and ports 32, 37 and 38, resulting in the establishment of normal conditions in the associated teat cup or cups. To provide for a gradual, as distinguished from an abrupt or sudden, restoration of the sub-atmospheric pressure established by the uncovering of a port 28, the radius of the valve 30 is gradually decreased at one side, as indicated at $x$ in Fig. 9, from that at which the port is fully covered to that at which it is fully uncovered; that is to say, the valve has a true circular contour throughout approximately one half its circumference with a radius of a length equal to or less than the distance of the port 28 from the center of the valve, and thence said radius gradually increases at one side throughout the remainder of the periphery of the valve. At a point approximately midway between the points where said increasing radius begins and ends the radius is such that the port 28 is fully covered by the valve, and located adjacent to said point is the front end of the arcuate port or channel 38 the opposite end of which is located adjacent to a radial shoulder 39 that marks the end of said increasing radius and the beginning of the true circular contour. Obviously, therefore, in the rotation of the valve each port 28 is maintained fully open to atmospheric pressure during approximately one fourth of a revolution, or throughout the length of the port 38, is gradually opened during the next quarter revolution to the sub-atmospheric pressure maintained in the pail, and is fully open to the sub-atmospheric pressure during the remainder of the revolution, or until closed by the passage thereover of the portion of the valve carrying the shoulder 39, followed practically instantaneously by restoration of normal atmospheric pressure through registration therewith of the adjacent end of the port 38. In other words, after a momentary lapse or reduction to normal atmospheric pressure, the sub-atmospheric pressure is restored gradually and continuously until it reaches its maximum which is then maintained throughout the length of time consumed in travel of the valve through one-half of a revolution.

In the preferred form of pulsator but two nipples 26 are employed, as shown in Fig. 9, it being designed that each shall have attached thereto an end of a tube 27 having branches 27ª leading to two of the four teat cups employed. Thus, two cups are actuated simultaneously and in alternation with the other two cups.

In the modified construction of pulsator shown in Figs. 11 and 12, two additional nipples 26' are employed, the same occupying diametrically opposite positions on the top of the base member 29 at a greater distance from the center of said base member than the nipples 26. Further, the valve 30' is formed with a lateral cam-like extension 40' at that side carrying the cam face or extension 40 in which is provided the port 38, said extension 40' having in the top face thereof in position to be carried into registration with the ports or bores 28' of said nipples 26' a channel or port 38' corresponding to said port 38. Said port 38' communicates with the passage 37 through an extension 37' of the latter, as shown in Fig. 11. To provide for gradual restoration of the sub-atmospheric pressure in the ports 28' and the connections leading thereto, a tapered or graduated entrance 41 is formed in the valve, as shown in Figs. 11 and 12, whereby said ports are gradually uncovered.

The relative arrangement of the nipples 26 and 26' and of the cam extensions 40 and 40' is such that one port 28 and one port 28' are simultaneously closed and the other two ports are simultaneously opened or uncovered gradually during the rotation of the valve 30'.

Rotation of the valve is effected through power transmitted thereto from the motor 17 which drives the pump 16. In order to provide for such transmission in the most direct manner, while maintaining the unitariness of the structure and at the same time providing for ready disassembling and reassembling of the parts constituted by the pump-and-motor inclosure 15, the pail 1 and the cover 24, a drive shaft composed of separable and self-interlocking, or self-coupling, sections is provided. Said drive shaft includes a vertical shaft 42 located mainly within the pump-and-motor inclosure 15 and having its upper end extending centrally, through the bottom of the casing 20 into the interior of the chamber 19. Said shaft 42 is journaled in suitable bearings and carries thereon a wormgear 43 in operative relation to a worm (not shown) carried by the shaft 44 through which power for driving the pump is transmitted from the motor. Another portion of said drive shaft is constituted by a two-part shaft 45 which is disposed within the tube 6 with its upper and lower ends projecting from the opposite ends of said tube. The projecting lower end of said shaft is provided with a tenon or tongue 46 adapted to seat in a corresponding groove or mortise provided in the adjacent end of shaft 42 whereby said shafts may be detachably interlocked as by a dental clutch. The upper end of said shaft 45 is also provided with a tenon or tongue 47 adapted to seat in a corresponding socket provided therefor in the under side of the valve 30 and located in alinement with the valve spindle 31.

The two-part shaft 45 comprises two similar shaft sections arranged in relatively telescoping relation, the adjacent ends of said sections being of semi-cylindrical form with their flat faces slidable one on the other. Each section carries upon its reduced end portion a collar 48, and interposed between said collars is a compressible spring 49 which serves to normally maintain said sections relatively thrust outward for increasing the length of said shaft beyond that necessary to couple the shaft 42 to the valve 30. Suitable gasket-like bearings, as 50, are disposed within the tube 6 in embracing relation to the two-part shaft 45 whereby, while permitting slight longitudinal movement of the sections, said sections are maintained in position within said tube.

In practice, when the pail is placed upon the pump-and-motor inclosing casing, the lower end of shaft 45 rests upon the end of shaft 42; and when the cover 24 is placed upon the pail, the under side of the valve 30 rests upon the upper end of said shaft 45. Then, when the motor is started, a partial rotation of said shaft 42 carries the mortise thereof into registering relation to the tongue 46 which then automatically seats in said mortise, being actuated so to do by the spring 49, resulting in rotation being imparted to said shaft 45. A partial rotation of said shaft 45 carries the upper tongue 47 thereof into registering relation to the socket in valve 30, whereupon said tongue is actuated by said spring 49 to seat in said socket, resulting in rotation being imparted to said valve.

What is claimed is—

1. A milking unit consisting of a milk pail, a pulsator superposed upon said pail and adapted for controlling variations of pneumatic stress, a pump whereby sub-atmospheric pressure is provided within said pail, said pump having means for detachable connection with the interior of the pail, a motor for driving said pump and for actuating said pulsator, and power transmission means extending through the interior of the pail for operating said pulsator, said motor being operatively connected to said transmission means.

2. A milking unit consisting of a milk pail, a pulsator superposed upon said pail and adapted for controlling variations of pneumatic stress, means for producing sub-atmospheric pressure within said pail, a motor for actuating said means and for driving said pulsator, and power transmission means intermediate said motor and said pulsator, said transmission means being located to operate through the interior of said pail.

3. A milking unit consisting of a milk pail, a pulsator superposed upon said pail and adapted for controlling variations of pneumatic stress, means for producing sub-atmospheric pressure within said pail, a motor for actuating said means and for driving said pulsator, said motor being operatively connected with said pulsator through the interior of said pail.

4. A milking unit consisting of a milk pail, a pulsator superposed upon said pail and adapted for controlling variations of pneumatic stress, means for producing sub-atmospheric pressure within said pail, a motor for actuating said means and for driving said pulsator, and power transmission means intermediate said motor and said pulsator, said transmission means being located to operate through the interior of said pail and being composed of self-coupling members.

5. A milking machine comprising a milk pail, a pulsator superposed upon said pail and adapted for controlling variations of pneumatic stress, means for producing sub-atmospheric pressure within the pail, a support underlying said pail and adapted to be detachably connected to the latter, a motor carried by said support, and power transmission means connecting said motor to said pulsator, said transmission means extending vertically through the interior of the pail and comprising separate shafts having means whereby they are coupled and uncoupled, respectively, by seating and unseating said pail with respect to said support.

6. A milking machine comprising a milk pail, a pulsator superposed upon said pail and adapted for controlling variations of pneumatic stress, means for producing sub-atmospheric pressure within the pail, a support underlying said pail and adapted to be detachably connected to the latter, a motor carried by said support, and power transmission means connecting said motor to said pulsator, said transmission means extending vertically through the interior of the pail and comprising vertically alined shafts respectively carried by said pail and said support, said shafts having end connections whereby they are coupled and uncoupled, respectively, by seating and unseating said pail with respect to said support.

7. A milking machine comprising a milk pail, a pulsator superposed upon said pail and adapted for controlling variations of pneumatic stress, a support underlying said pail and adapted to be detachably connected to the latter, a pump carried by said support for producing sub-atmospheric pressure within said pail, said pump having tubes leading thereto, one tube located within and the other without said pail, and through which air is exhausted from the pail, coupling means whereby said tubes may be operatively connected and disconnected through a partial rotation of the pail with respect to said support when the former is seated upon the latter, and means operating through the interior of the pail for actuating said pulsator.

8. A milking machine comprising a milk pail, a pulsator superposed upon said pail and adapted for controlling variations of pneumatic stress, a support underlying said pail and adapted to be detachably connected to the latter, a pump carried by said support for producing sub-atmospheric pressure within said pail, said pump having tubes leading thereto, one tube located within and the other without said pail, and through which air is exhausted from the pail, coupling means whereby said tubes may be operatively connected and disconnected through a partial rotation of the pail with respect to said support when the former is seated upon the latter, a motor carried by said support for driving said pump and for actuating said pulsator, and means extending through the interior of said pail whereby power is transmitted from said motor to said pulsator.

9. A milking machine comprising a milk pail, a pulsator superposed upon said pail and adapted for controlling variations of pneumatic stress, a support underlying said pail and adapted to be detachably connected to the latter, a pump carried by said support for producing sub-atmospheric pressure within said pail, said pump having tubes leading thereto, one tube located within and the other without said pail, and through which air is exhausted from the pail, coupling means whereby said tubes may be operatively connected and disconnected through a partial rotation of the pail with respect to said support when the former is seated upon the latter, a motor carried by said support for driving said pump and for actuating said pulsator, and means extending through the interior of said pail whereby power is transmitted from said motor to said pulsator, said transmission means comprising members which are coupled and uncoupled, respectively, by seating and unseating said pail with respect to said support.

10. A milking machine comprising a milk pail, a pulsator superposed upon said pail and adapted for controlling variations of pneumatic stress, an air-exhaust tube disposed within said pail with its upper end located near the top of the pail and having its lower end extending through the bottom of the pail, a support underlying said pail and adapted to be detachably connected to the latter, a pump carried by said support and having an inlet tube leading thereto, means whereby said tubes may be coupled and uncoupled through a partial rotation of the pail with respect to said support, a motor carried by said support for driving said pump and for actuating said pulsator, and means adapted to be coupled and uncoupled, respectively, by seating and unseating said pail with respect to said support whereby power is transmitted through the interior of said pail from said motor to said pulsator.

11. A milking machine comprising a milk pail, a pulsator superposed upon said pail and adapted for controlling variations of pneumatic stress, a casing having a part adapted to receive said pail in seated relation thereto, interengageable means carried by said pail and said casing whereby the latter may be detachably connected, a pump carried by said casing and operable through said connecting means for producing sub-atmospheric pressure within the pail, a motor carried by said casing and adapted to drive said pump, and power transmission gearing adapted to be coupled through said connecting means whereby said pulsator is driven from said motor.

12. The combination with a milk pail and means for producing sub-atmospheric pressure within said pail, of a pulsator superposed on said pail, said pulsator comprising a valve seat having a pair of ports opening therethrough, a rotary valve mounted upon said seat and having a passage therethrough, one end of said passage being constantly open to a source of atmospheric pressure and the other end opening through the face of the valve and adapted for alternate registration with the ports of said valve seat, said valve being of cam shape to allow said ports to remain uncovered and open to the sub-atmospheric pressure within the pail throughout approximately three-fourths of each revolution thereof.

13. The combination with a milk pail and means for producing sub-atmospheric pressure within said pail, of a pulsator superposed on said pail, said pulsator comprising a valve seat having a pair of ports opening therethrough, a rotary valve mounted upon said seat and having a passage therethrough, one end of said passage being constantly open to a source of atmospheric pressure and the other end opening through the face of the valve and adapted for alternate registration with the ports of said valve seat, said valve having such size and shape that it alternately closes said ports against admission therethrough of the sub-atmospheric pressure within the pail and maintains said ports so closed only throughout approximately one fourth of each revolution thereof.

14. The combination with a milk pail and means for producing sub-atmospheric pressure within said pail, of a pulsator superposed on said pail, said pulsator comprising a valve seat having a pair of ports opening therethrough, a rotary valve mounted upon said seat and having a passage therethrough, one end of said passage being constantly open to a source of atmospheric pressure and the other end opening through the face of the valve and adapted for alternate registration with the ports of said valve seat, said valve having such size and shape that it alternately opens and closes said ports, respectively, to and from admission thereto of the sub-atmospheric pressure within the pail and that the ratio of the interval of closing to that of opening is approximately one to three.

15. The combination with a milk pail and means for producing sub-atmospheric pressure within said pail, of a pulsator superposed on said pail, said pulsator comprising a valve seat having two sets of ports opening therethrough at different distances from its center, the ports of each set being located at diametrically opposite points, and a rotary valve mounted upon said seat and having two elongated arcuate ports opening through the face thereof at distances from its axis corresponding respectively with the distances of the two sets of ports from the center of said seat; said valve being also provided with a passage permanently connecting both of said arcuate ports to a source of atmospheric pressure, said valve having a form adapting it to alternately and respectively open and close the ports of each set in the valve seat with respect to the interior of the pail and to allow said ports to remain open during an interval exceeding that during which they remain closed.

16. A milking unit comprising a milk pail, means for producing sub-atmospheric pressure within the pail, a pulsator associated with said pail and arranged to control variations of pneumatic stress, means for driving said pulsator, and a support upon which said pail rests, said support carrying said driving means.

17. A milking unit comprising a milk pail, means for producing sub-atmospheric pressure within the pail, a pulsator associated with said pail and arranged to control variations of pneumatic stress, a power unit for driving said pulsator, and an inclosure for said unit constituting a support for the pail, said pail and said support being detachably connected.

18. A milking unit comprising a milk pail, means for producing sub-atmospheric pressure within the pail, a pulsator associated with said pail and arranged to control variations of pneumatic stress, a power unit for driving said pulsator, and a supporting element for said power unit upon which said pail is superposed.

19. A milking unit consisting of a milk pail, a pulsator embodying a single rotary element superposed upon said pail and adapted for controlling variations of pneumatic stress, means for producing sub-atmospheric pressure within said pail, a motor for actuating said means and for driving said pulsator, said motor being operatively connected with said pulsator.

20. A milking unit consisting of a milk pail, a pulsator embodying a single rotary element adapted for controlling variations of pneumatic stress, means for producing sub-atmospheric pressure within said pail, a motor for actuating said means and for driving said pulsator, said motor being operatively connected with said pulsator.

In testimony whereof, I affix my signature in presence of two subscribing witnesses.

FREDERICK A. GESSLER.

Witnesses:
G. O. SMITH,
H. E. DUNLAP.